United States Patent
Greenblatt et al.

(10) Patent No.: US 10,286,943 B1
(45) Date of Patent: May 14, 2019

(54) MATERIAL HANDLING DEVICE

(71) Applicant: Marlin Steel Wire Products LLC, Baltimore, MD (US)

(72) Inventors: Drew A. Greenblatt, Potomac, MD (US); Wesley Chan, Columbia, MD (US); Andrew Montgomery, Laurel, MD (US); Richard Bates, Baltimore, MD (US); Kendall Browning, Gambrills, MD (US)

(73) Assignee: MARLIN STEEL WIRE PRODUCTS LLC, Baltimore, MD (US)

( * ) Notice: Subject to any disclaimer, the term of this patent is extended or adjusted under 35 U.S.C. 154(b) by 0 days.

(21) Appl. No.: 15/963,961

(22) Filed: Apr. 26, 2018

(51) Int. Cl.
*B62B 3/10* (2006.01)
*B62B 15/00* (2006.01)
*B65D 19/42* (2006.01)
*B65D 19/08* (2006.01)

(52) U.S. Cl.
CPC ........ *B62B 15/008* (2013.01); *B62B 2203/00* (2013.01); *B62B 2301/04* (2013.01); *B62B 2301/254* (2013.01); *B65D 19/08* (2013.01); *B65D 19/42* (2013.01); *B65D 2519/00308* (2013.01); *B65D 2519/00407* (2013.01); *B65D 2519/00781* (2013.01)

(58) Field of Classification Search
CPC .............. B62B 15/008; B62B 2301/04; B62B 2301/254; B62B 2203/00; B62B 1/264; B62B 3/104; B62B 2202/02; B62B 3/028; B65D 2519/00781; B65D 2519/00407; B65D 2519/00308; B65D 19/08; B65D 19/42
See application file for complete search history.

(56) References Cited

U.S. PATENT DOCUMENTS

| 422,729 | A | * | 3/1890 | Clark | 248/129 |
| 973,029 | A | * | 10/1910 | Froese | B62B 3/00 220/630 |
| 1,013,605 | A | * | 1/1912 | Lyon | 248/129 |
| 1,328,458 | A | * | 1/1920 | Schiek | A47J 47/18 16/30 |
| 1,628,722 | A | * | 5/1927 | Haertel | B62B 5/0083 248/129 |

(Continued)

OTHER PUBLICATIONS

"Stainless Steel Drum Dolly for 30 Gallon Drum—800 Lb. Capacity," https://www.globalindustrial.com/p/material-handling/drumbarrel/drum-dollies/stainless-steel-drum-dolly-30-gallon-drum, Global Industrial, Port Washington, NY (visited Mar. 23, 2018).

*Primary Examiner* — Jacob B Meyer

(74) *Attorney, Agent, or Firm* — Miles & Stockbridge P.C.

(57) ABSTRACT

A material handling device is provided. The material handling device includes a bottom, a frame, a wall, an a plurality of wheels. The bottom includes an upper surface and a lower surface. The frame includes an upper surface and a lower surface. The wall surrounds the bottom and the frame, and includes an inner surface, an outer surface and an inner shelf attached to a lower portion of the inner surface. The inner surface includes an upper surface attached to a portion of the lower surface of the bottom, and a lower surface attached to a portion of the upper surface of the frame. Each wheel is attached to the lower surface of the frame.

15 Claims, 12 Drawing Sheets

(56) References Cited

U.S. PATENT DOCUMENTS

| | | | | |
|---|---|---|---|---|
| 2,078,119 A * | 4/1937 | Benedict | B62B 1/264 | 280/47.24 |
| 2,531,131 A * | 11/1950 | Johnson | A47J 47/16 | 248/129 |
| 2,573,085 A * | 10/1951 | Yonkers | A47L 9/009 | 15/327.2 |
| 2,818,271 A * | 12/1957 | Saeli | B62B 5/0083 | 248/129 |
| 2,917,769 A * | 12/1959 | Kasper | A47L 9/009 | 15/246.4 |
| 2,930,561 A * | 3/1960 | Bittle | B62B 1/264 | 211/85.19 |
| 2,947,548 A * | 8/1960 | Bard | A47L 13/48 | 280/79.2 |
| 3,298,704 A * | 1/1967 | Dewers | B62B 5/0083 | 280/35 |
| 3,377,085 A * | 4/1968 | Fralick | B60D 1/00 | 280/408 |
| 3,554,573 A * | 1/1971 | Miller | B62B 5/0083 | 248/154 |
| 3,734,527 A * | 5/1973 | Bard | B62B 5/0083 | 280/79.5 |
| 3,802,717 A * | 4/1974 | Eitreim | B62B 5/0083 | 248/154 |
| 3,845,968 A * | 11/1974 | Larson | B62B 1/264 | 248/129 |
| 3,923,318 A * | 12/1975 | Renard | A45C 13/385 | 280/35 |
| 4,071,163 A * | 1/1978 | Martin | B44D 3/128 | 215/393 |
| 4,635,951 A * | 1/1987 | Berfield | B62B 5/0006 | 280/47.34 |
| 4,640,521 A * | 2/1987 | Berfield | B62B 3/104 | 248/129 |
| 4,650,200 A * | 3/1987 | Berfield | B62B 3/104 | 248/154 |
| 4,799,699 A * | 1/1989 | Berfield | B62B 3/104 | 15/323 |
| 4,862,909 A * | 9/1989 | Kim | F04B 43/08 | 137/150 |
| D309,811 S * | 8/1990 | Terrizzi | D34/23 | |
| 5,074,572 A * | 12/1991 | Delmerico | B62B 5/0083 | 220/298 |
| 5,088,751 A * | 2/1992 | Zint | B62B 3/104 | 280/47.34 |
| 5,110,147 A * | 5/1992 | Gershman | B60D 1/00 | 248/907 |
| RE34,130 E * | 11/1992 | Berfield | B62B 3/104 | 248/129 |
| D340,563 S * | 10/1993 | Kean | D34/23 | |
| 5,261,350 A * | 11/1993 | Vavrek | A01K 1/0353 | 119/165 |
| 5,445,396 A * | 8/1995 | Sebor | B62B 3/16 | 108/53.3 |
| 5,472,220 A * | 12/1995 | Stephan | B62B 5/0083 | 280/79.11 |
| 5,515,573 A * | 5/1996 | Frey | A47L 5/365 | 15/323 |
| D370,757 S * | 6/1996 | Loftus | D34/23 | |
| 5,580,205 A * | 12/1996 | Frystak | A01D 87/127 | 242/557 |
| D381,171 S * | 7/1997 | Culverson | D34/23 | |
| 5,678,976 A * | 10/1997 | Rodriguez | B62B 1/264 | 414/448 |
| 5,752,543 A * | 5/1998 | Groening | B62B 3/104 | 137/312 |
| 6,027,128 A * | 2/2000 | Stich | B60B 33/0002 | 280/47.16 |
| 6,209,891 B1 * | 4/2001 | Herrmann | B44D 3/14 | 280/32.6 |
| 6,237,187 B1 * | 5/2001 | Hult | A47L 5/365 | 15/323 |
| RE37,350 E * | 9/2001 | Stephan | B62B 5/0083 | 280/79.11 |
| 6,315,310 B1 * | 11/2001 | Hurt | B62B 1/264 | 206/373 |
| 6,419,246 B1 * | 7/2002 | Neal | B62B 5/0083 | 280/47.34 |
| 6,488,293 B1 * | 12/2002 | Mitchell | B62B 3/104 | 280/47.34 |
| 6,655,084 B1 * | 12/2003 | Missry | A01G 9/04 | 47/39 |
| 6,729,631 B2 * | 5/2004 | Trine | B62B 3/008 | 280/47.11 |
| 6,815,036 B1 * | 11/2004 | Romero | B44D 3/128 | 118/504 |
| 6,893,032 B2 * | 5/2005 | Kershaw | B62B 5/0083 | 280/47.11 |
| 6,964,423 B1 * | 11/2005 | Chieh | B62B 5/0083 | 248/129 |
| 7,114,288 B1 * | 10/2006 | Kershaw | A47G 7/041 | 47/39 |
| 7,281,720 B1 * | 10/2007 | Richards | B62B 3/104 | 280/79.11 |
| 7,364,172 B1 * | 4/2008 | Archer | B62B 3/104 | 220/625 |
| 7,540,508 B2 * | 6/2009 | Shragge | B62B 1/125 | 220/737 |
| 7,584,973 B2 * | 9/2009 | Brager | B25H 3/026 | 108/141 |
| 7,823,907 B1 * | 11/2010 | Coholan | B62B 15/008 | 280/47.26 |
| 7,845,656 B2 * | 12/2010 | Thompson | B25H 3/00 | 280/47.35 |
| 8,262,108 B2 * | 9/2012 | Al-Hasan | B62B 3/04 | 280/47.34 |
| 8,376,376 B2 * | 2/2013 | Thibault | A47L 13/58 | 280/79.11 |
| 8,602,425 B1 * | 12/2013 | Meier, III | B62B 1/14 | 280/47.26 |
| 9,162,694 B1 * | 10/2015 | Fucarino | B62B 1/264 | |
| 9,446,777 B2 * | 9/2016 | Umbro | B62B 1/12 | |
| 9,610,963 B2 * | 4/2017 | Jensen | B62B 3/10 | |
| 9,815,622 B2 * | 11/2017 | Dafoe | B65F 1/068 | |
| 9,845,215 B1 * | 12/2017 | Willard | B65H 16/00 | |
| 2004/0145139 A1 * | 7/2004 | Kershaw | B62B 5/0083 | 280/79.5 |
| 2004/0245735 A1 * | 12/2004 | Pins | B62B 1/142 | 280/79.5 |
| 2006/0188362 A1 * | 8/2006 | Link | B65G 65/24 | 414/403 |
| 2006/0214384 A1 * | 9/2006 | Gwin | A47L 13/51 | 280/79.5 |
| 2007/0096413 A1 * | 5/2007 | Staracino | B62B 1/12 | 280/47.26 |
| 2007/0120337 A1 * | 5/2007 | Gibbs | A01B 1/00 | 280/79.3 |
| 2008/0164669 A1 * | 7/2008 | Stone | B62B 1/12 | 280/79.5 |
| 2008/0272566 A1 * | 11/2008 | Thompson | B25H 3/00 | 280/79.5 |
| 2009/0050761 A1 * | 2/2009 | Gunsaullus | E06C 7/14 | 248/242 |
| 2010/0038883 A1 * | 2/2010 | Thedford | B60P 3/07 | 280/490.1 |
| 2012/0286486 A1 * | 11/2012 | Varney | B62B 5/0093 | 280/47.11 |
| 2013/0186919 A1 * | 7/2013 | Jacques | A47L 13/26 | 222/608 |
| 2013/0334797 A1 * | 12/2013 | Umbro | B62B 1/042 | 280/654 |
| 2014/0265194 A1 * | 9/2014 | Gwin | B62B 3/104 | 280/47.34 |
| 2014/0299068 A1 * | 10/2014 | Kupka | A01K 1/0107 | 119/501 |
| 2015/0001820 A1 * | 1/2015 | Cormier | B62B 1/14 | 280/47.26 |

(56) References Cited

U.S. PATENT DOCUMENTS

| | | | |
|---|---|---|---|
| 2015/0108729 A1* | 4/2015 | Kolesnikova | B62B 3/104 280/79.5 |
| 2016/0031467 A1* | 2/2016 | Beaver | B62B 3/10 280/659 |
| 2016/0325772 A1* | 11/2016 | Jensen | B62B 3/10 |
| 2018/0340813 A1* | 11/2018 | Cowles | B62B 3/104 |

* cited by examiner

MATERIAL HANDLING DEVICE

TECHNICAL FIELD

The present invention relates to a material handling device. More particularly, the present invention relates to a material handling device for use in a manufacturing facility.

BACKGROUND

Material handling devices are widely employed in a variety of industries, and transport raw material, parts, components, subassemblies, assemblies, finished products, etc., throughout a manufacturing facility. Floats or dollies can transport drums or other containers to and from work areas in a manufacturing facility.

For example, Global Industrial manufactures a stainless steel drum dolly for transporting a 30 gallon drum (https://www.globalindustrial.com/p/material-handling/drum-barrel/drum-dollies/stainless-steel-drum-dolly-30-gallon-drum). This dolly has a cross-shaped frame that supports the drum, a circumferential lip that holds the drum in place, and four caster wheels that are attached to the cross-shaped frame.

This simple design has drawbacks in many different manufacturing environments.

SUMMARY

Embodiments of the present invention provide a material handling device. The material handling device includes a bottom, a frame, a wall, and a plurality of wheels. The bottom includes an upper surface and a lower surface. The frame includes an upper surface and a lower surface. The wall surrounds the bottom and the frame, and includes an inner surface, an outer surface, and an inner shelf attached to a lower portion of the inner surface. The inner surface includes an upper surface attached to a portion of the lower surface of the bottom, and a lower surface attached to a portion of the upper surface of the frame. Each wheel is attached to the lower surface of the frame.

DETAILED DESCRIPTION

Figure 1:
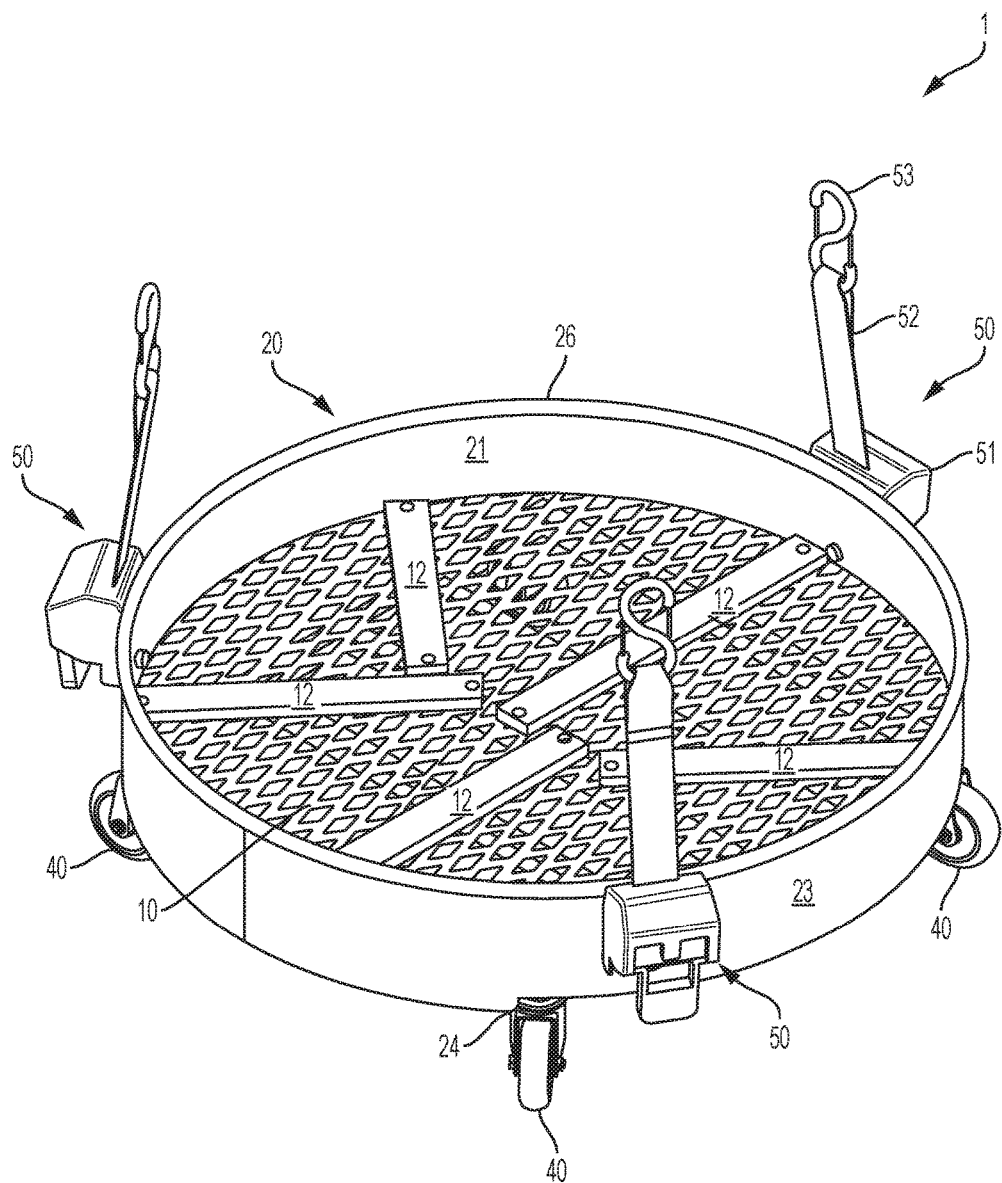
FIG. 1 is a perspective view from above of a material handling device, in accordance with an embodiment of the present invention.

The invention will now be described with reference to the drawing figures, in which like reference numerals refer to like parts throughout.

Embodiments of the present invention advantageously provide a material handling device that securely holds delicate and/or sensitive components and inhibits metal-on-metal contact while moving around a manufacturing facility. Additionally, the inventive material handling device advantageously supports multiple transportation configurations.

Figure 2:
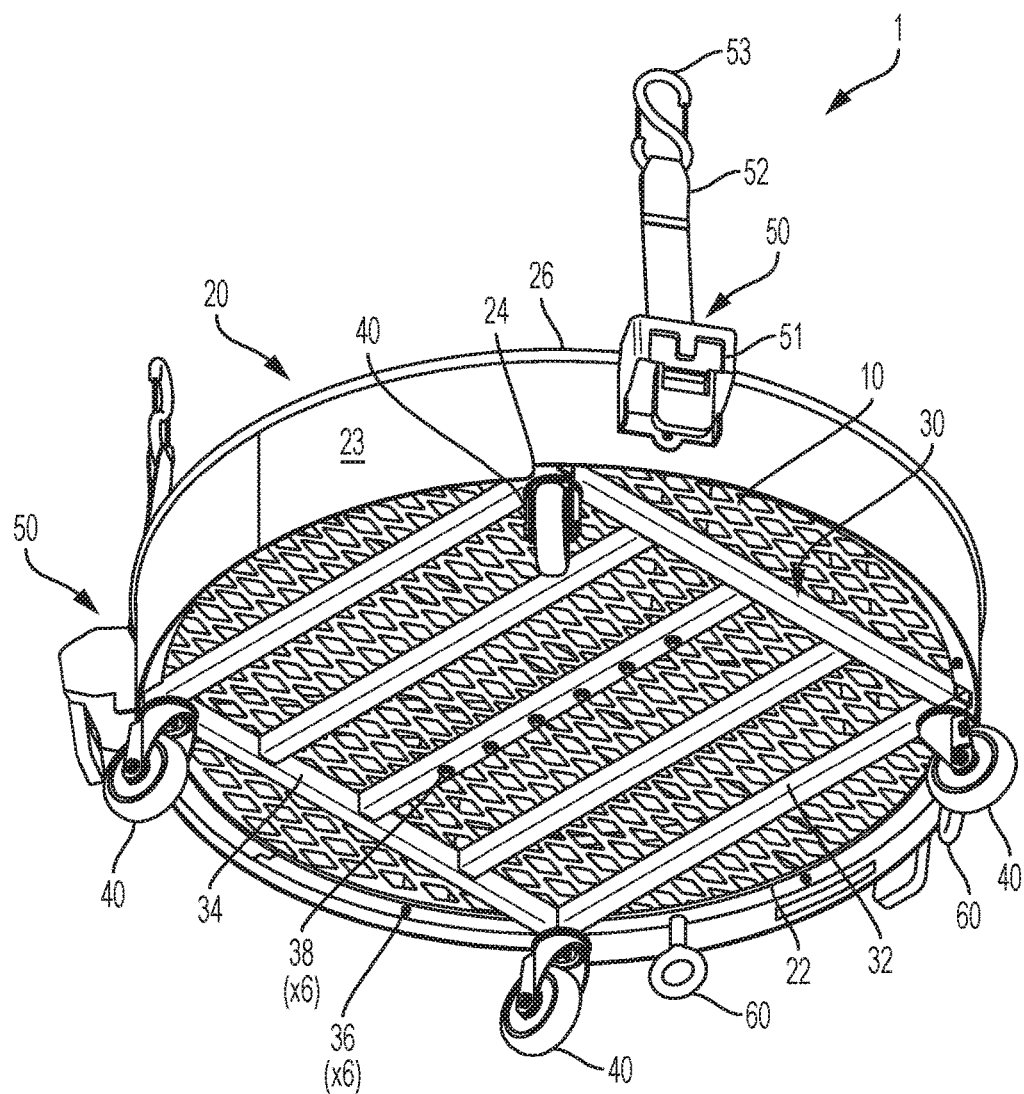
FIG. 2 is a perspective view from below of the material handling device depicted in FIG. 1.
Figure 3:
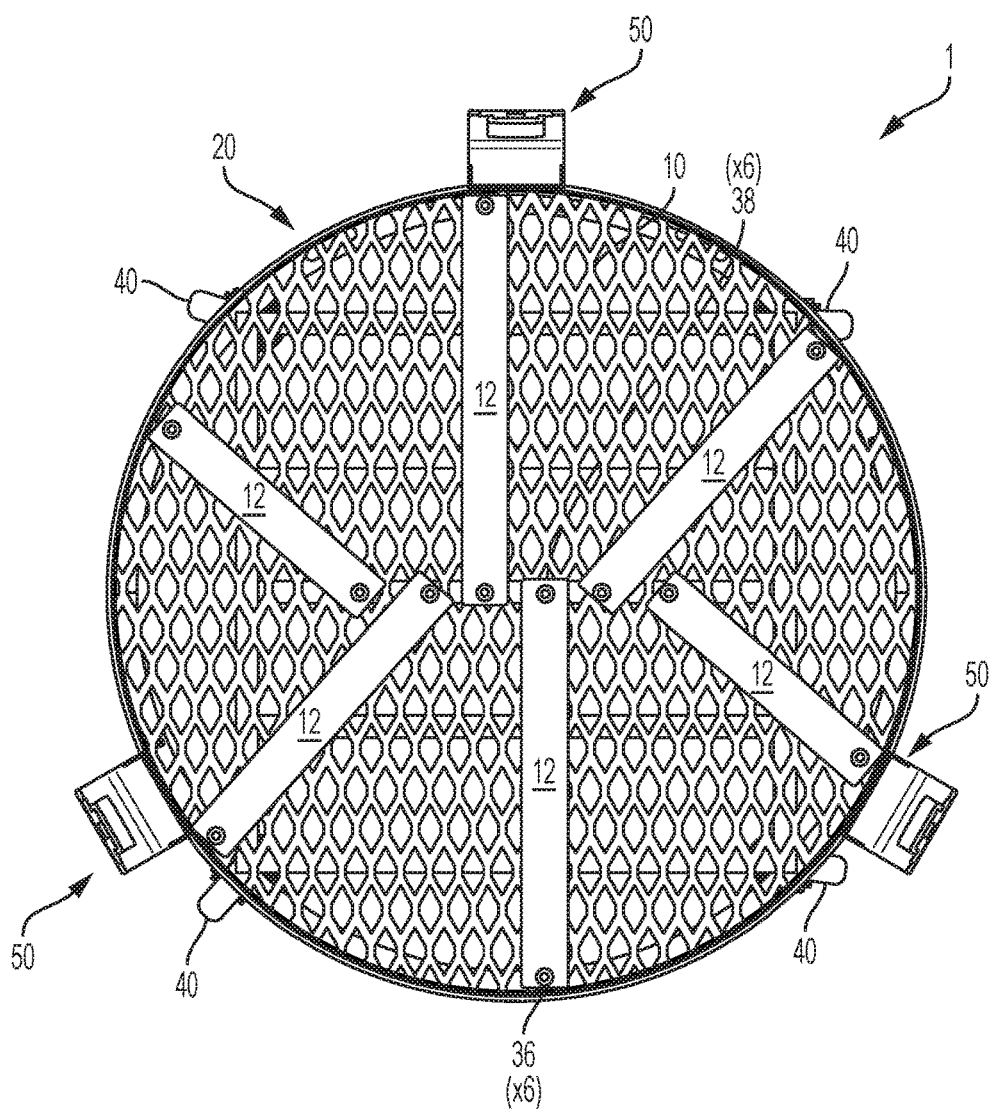
FIG. 3 is a top view of the material handling device depicted in FIG. 1.
Figure 4:
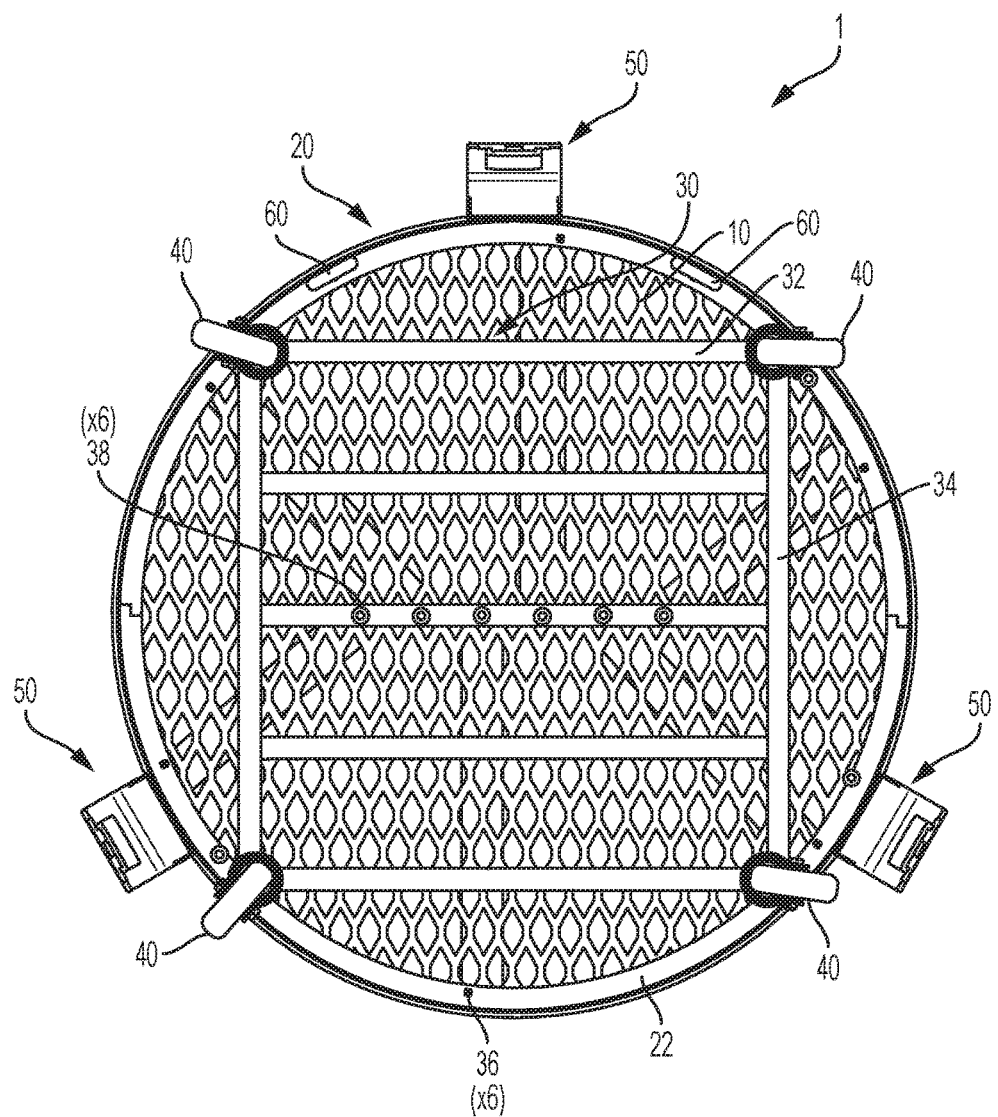
FIG. 4 is a bottom view of the material handling device depicted in FIG. 1.
Figure 5:
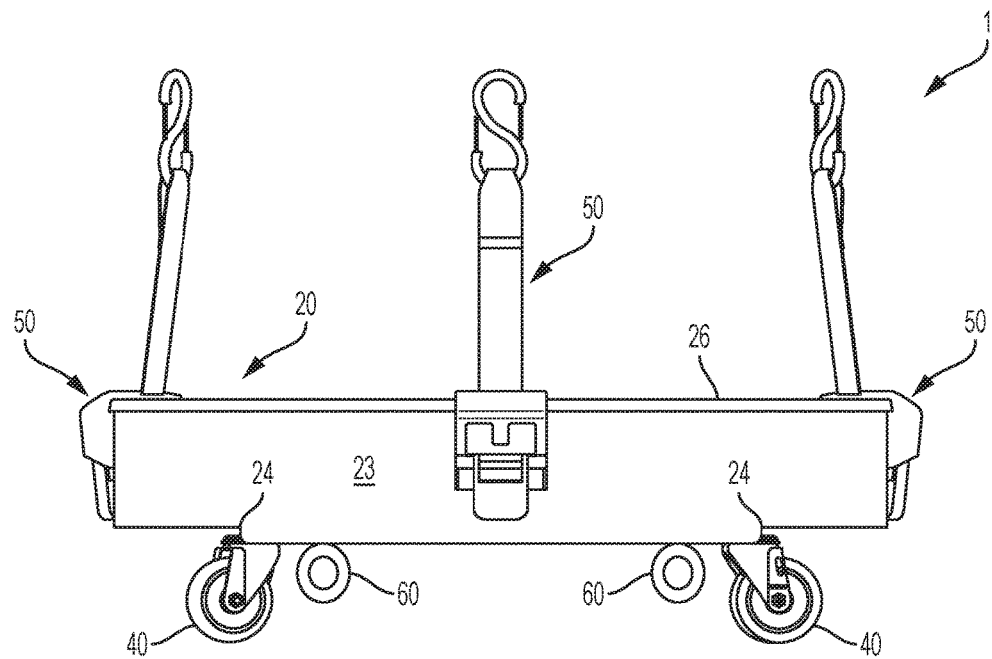
FIG. 5 is a front view of the material handling device depicted in FIG. 1.
Figure 6:
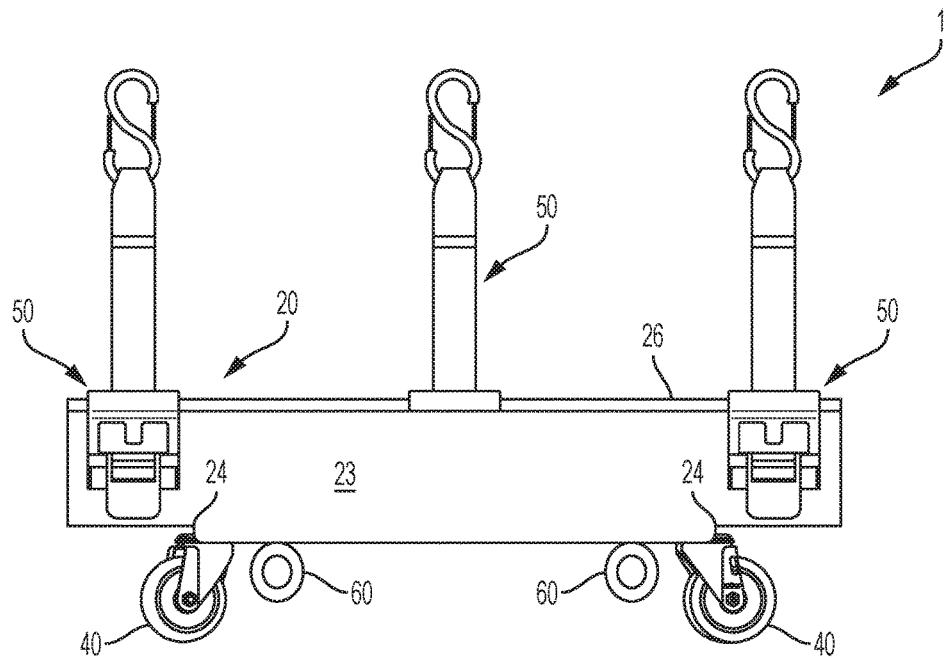
FIG. 6 is a rear view of the material handling device depicted in FIG. 1.
Figure 7:
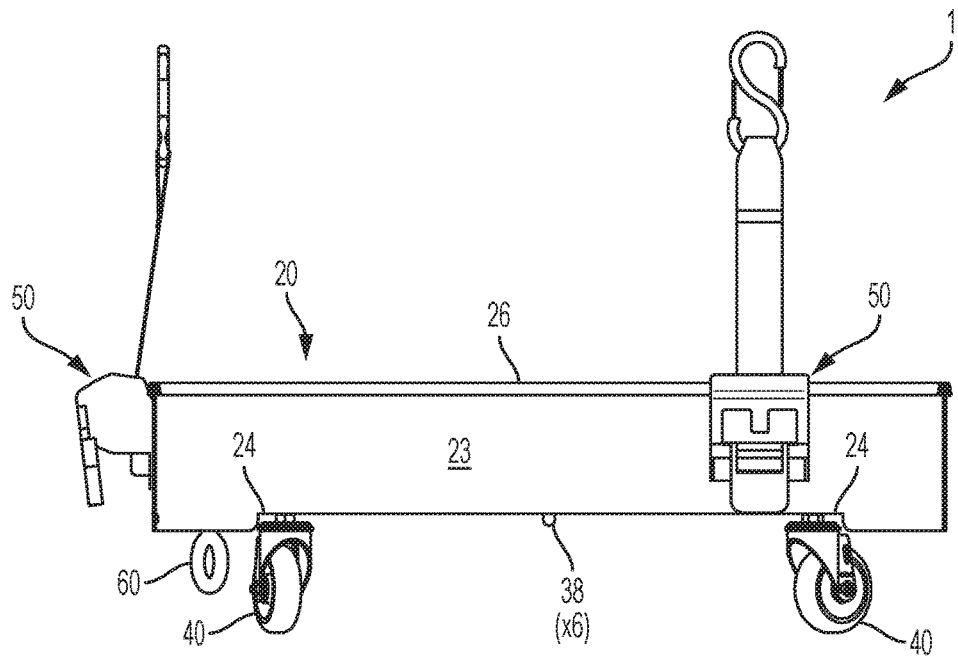
FIG. 7 is a left side view of the material handling device depicted in FIG. 1.
Figure 8:
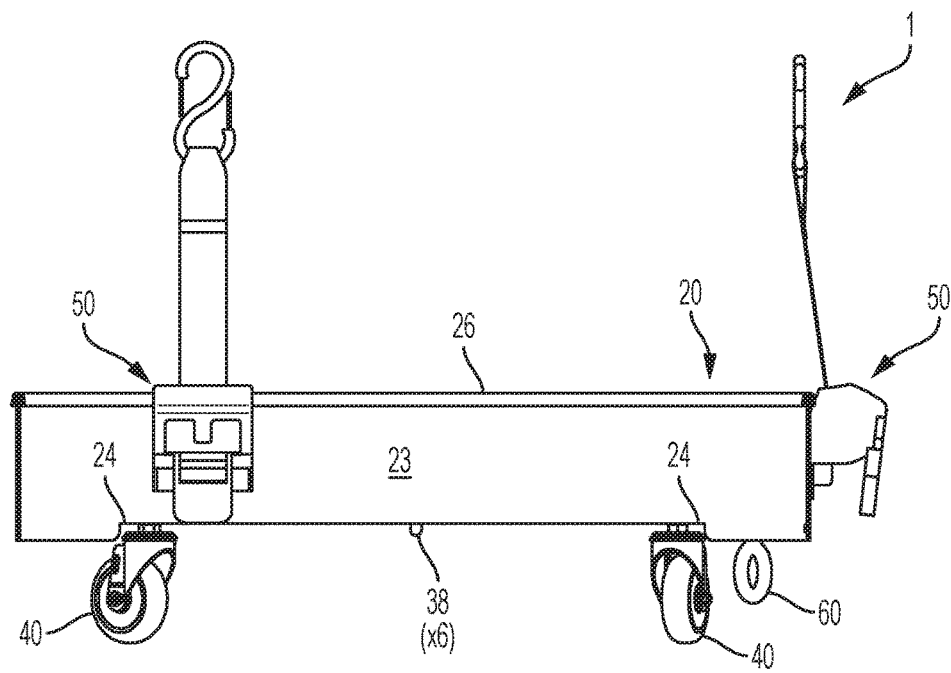
FIG. 8 is a right side view of the material handling device depicted in FIG. 1.

FIGS. 1-8 present various views of material handling device 1, in accordance with an embodiment of the present invention.

In this embodiment, material handling device 1 has a round shape approximately 36 inches in diameter, and includes bottom 10, wall 20, frame 30 and wheels 40. In other embodiments, material handling device 1 may have different dimensions and shapes, such as, for example, a 48 inch diameter, a square shape, a rectangular shape, a triangular shape, etc.

Bottom 10 may be formed from steel mesh, such as, for example, 1½" #9 flattened expanded steel. In other embodiments, bottom 10 may be formed from solid steel sheet, perforated steel sheet, aluminum mesh, aluminum sheet, perforated aluminum sheet, etc. When present, the openings in the material selected for bottom 10 advantageously allow smaller items to fall through while preventing larger items from falling through. The size of the openings determines whether a particular item will fall through bottom 10.

Rubber strips 12 may be attached to the upper surface of bottom 10, which advantageously prevents metal parts loaded into material handling device 1 from touching the metal of bottom 10. In this embodiment, six rubber strips are arranged on the upper surface of bottom 10; other numbers of rubber strips 12 may also be used. In one embodiment, rubber strips 12 are 0.5 inches thick and have a Shore 70A hardness.

Wall 20 may be formed from steel, such as, for example, 1008 plain steel, 1010 plain steel, etc., having a thickness of approximately 0.1 inches. In other embodiments, wall 20 may have a different thickness, wall 20 may be formed from a different material (such as, for example, aluminum, etc.), etc. In this embodiment, wall 20 surrounds or encloses bottom 10 and frame 30; in other embodiments, wall 20 may surround or enclose either bottom 10 or frame 30, wall 20 may partially surround or enclose bottom 10 or frame 30, wall 20 may partially surround or enclose bottom 10 or frame 30, etc.

Inner shelf 22 is disposed along the lower portion of the inner surface 21 of wall 20. Inner shelf 22 is formed from steel, such as, for example, 1008 plain steel, 1010 plain steel, etc., and has a thickness of approximately 0.25 inches and a depth of approximately 0.5 inches. In other embodiments, inner shelf 22 may have a different thickness or depth, and may be formed from a different material (such as, for example, aluminum, etc.), etc. Inner shelf 22 is attached to inner surface 21 of wall 20 using, for example, a TIG weld, a MIG weld, etc. Similarly, bottom 10 is attached to the upper surface of inner shelf 22 using, for example, a TIG weld, a MIG weld, etc., and frame 30 is attached to the lower surface of inner shelf 22 using, for example, a TIG weld, a MIG weld, etc.; other attachment mechanisms may also be used. In this embodiment, rubber strips 12 are secured to the upper surface of inner shelf 22 using countersunk flat head screws 38; other permanent, semi-permanent or temporary attachment mechanisms may also be used, such as, for example, hex head screws, plastic cable ties, etc.

In certain embodiments, inner surface 21 and upper edge 26 of wall 20 may be coated with a polyurethane-elastomer compound, such as, for example, Rhino Tuffgrip®, which advantageously prevents metal parts loaded into material handling device 1 from touching the metal of wall 20. In another embodiment, a rubber cap (not shown) may be attached to the upper edge 26 of wall 20.

Retractable ratchet straps 50 may be attached to the upper portion of the outer surface 23 of wall 20 to advantageously secure a variety of part sizes to material handling device 1. In this embodiment, three retractable ratchet straps 50 are depicted; other numbers and types of tie down mechanisms may also be used. Each retractable ratchet strap 50 includes a ratchet mechanism 51, a retractable strap 52 and an S biner 53. In one embodiment, retractable ratchet straps 50 are Reese retractable transom tie downs (2"×43").

Eye bolts 60 may be attached to, and depend from, the lower surface of inner shelf 22 to advantageously allow several material handling device 1 to be attached to one another, pulled by a forklift, tug, etc. Eye bolts 60 are formed from steel, such as, for example, 1008 plain steel, 1010 plain steel, etc., and are affixed to the lower surface of inner shelf 22 at the front of material handling device 1 using, for example, a TIG weld, a MIG weld, etc. In this embodiment, two eye bolts are used; other numbers and types of tow points may also be used.

Frame 30 generally provides support for bottom 10 and wall 20. Generally, frame 30 is formed in a grid pattern from tubes made from steel, such as, for example, 1008 plain steel, 1010 plain steel, etc., that are attached together using, for example, TIG welds, MIG welds, etc. The upper surfaces of each tube collectively form the upper surface of frame 30, while the lower surfaces of each tube collectively form the lower surface of frame 30. In this embodiment, frame 30 includes five (5) transverse rectangular tubes 32 and two longitudinal rectangular tubes 34. Other shapes and numbers of transverse rectangular tubes 32 and longitudinal rectangular tubes 34 may also be used.

Rubber strips 12 are secured to the middle transverse rectangular tube 32 of frame 30 using countersunk flat head screws 36; other permanent, semi-permanent or temporary attachment mechanisms may also be used, such as, for example hex head screws, plastic cable ties, etc. Cutout regions 24 may be located on either side of wall 20, opposite each longitudinal rectangular tube 34, and a wheel 40 may be attached to each lower corner of frame 30. The layout of the tubes of frame 30 and the location of wheels 40 advantageously allow the material handling device 1 to be raised by a forklift from either side, to be raised by a pallet jack device from any side, etc. In this embodiment, wheels 40 are swivel caster wheels.

Figure 9:
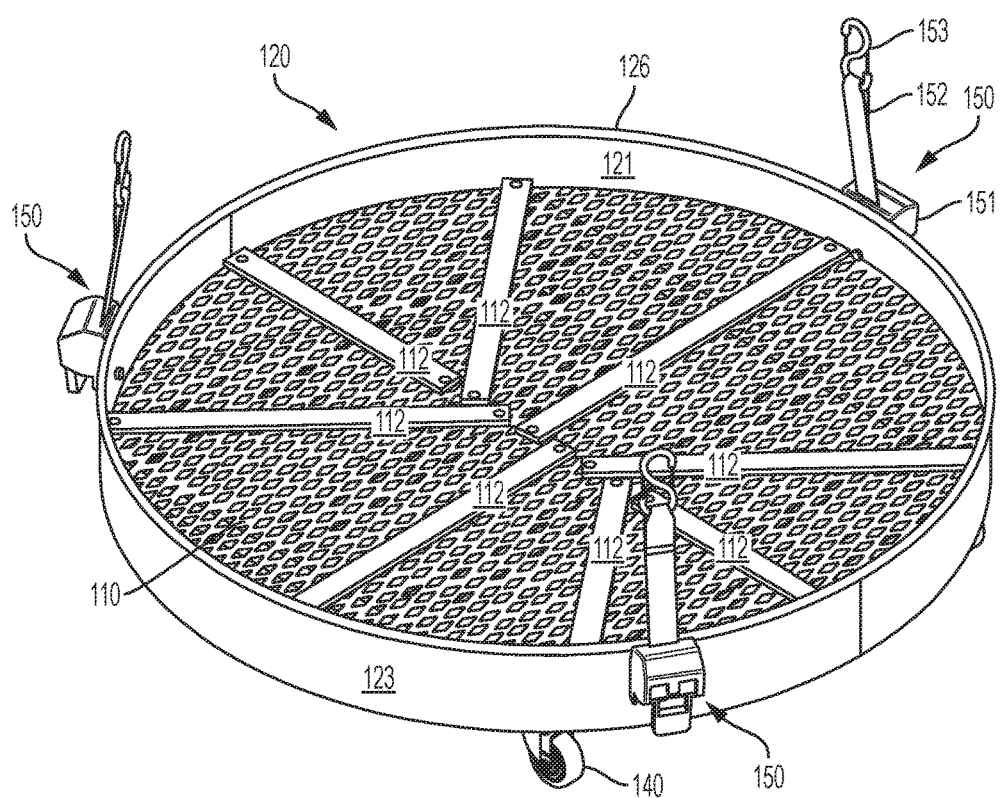
FIG. 9 is a perspective view from above of a material handling device, in accordance with an embodiment of the present invention.
Figure 10:
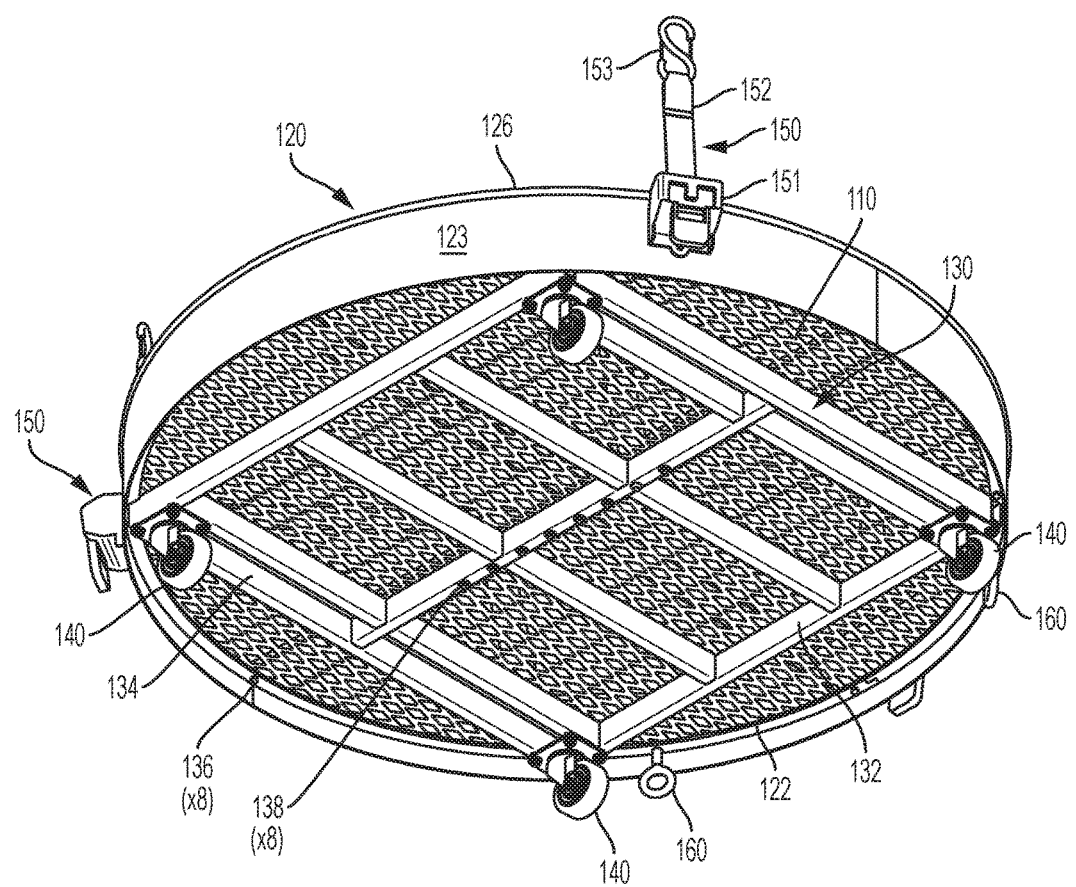
FIG. 10 is a perspective view from below of the material handling device depicted in FIG. 9.
Figure 11:
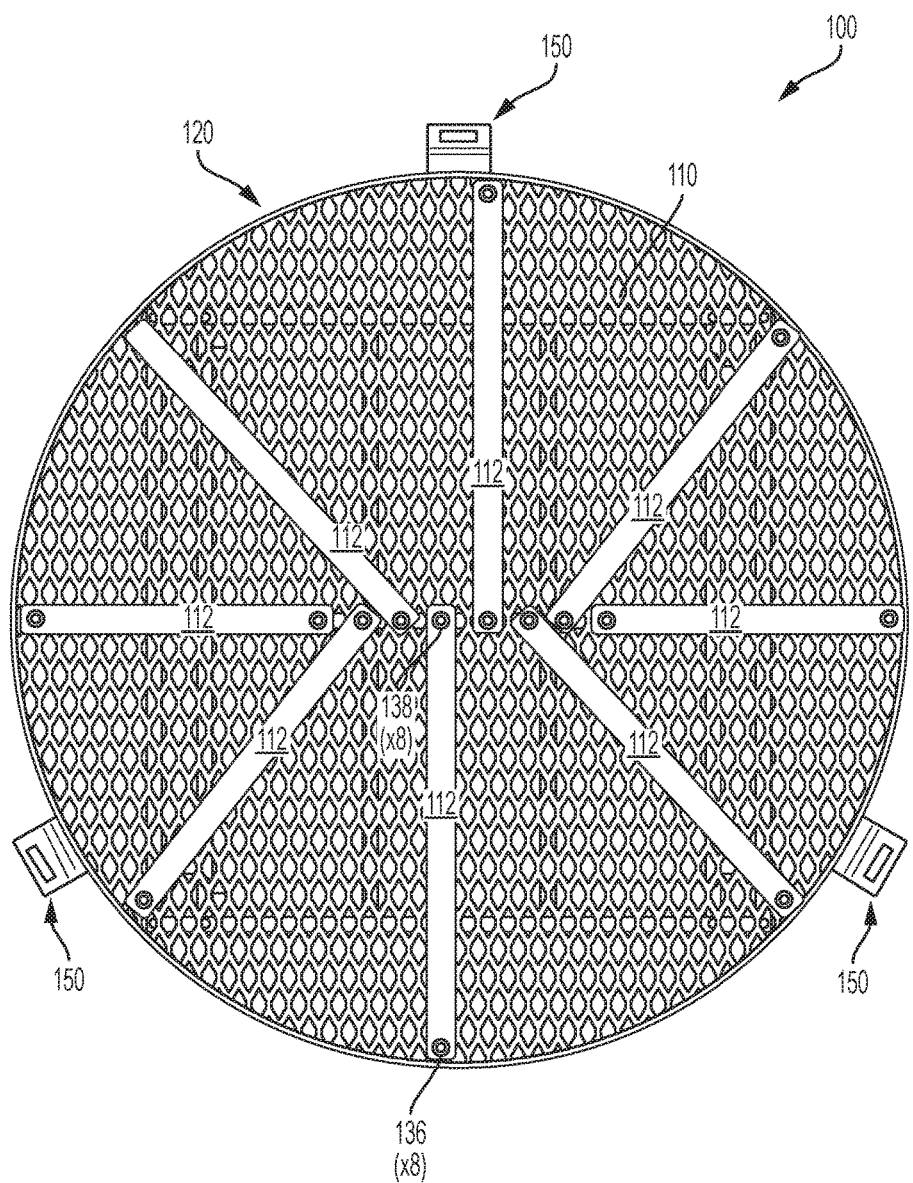
FIG. 11 is a top view of the material handling device depicted in FIG. 9.
Figure 12:
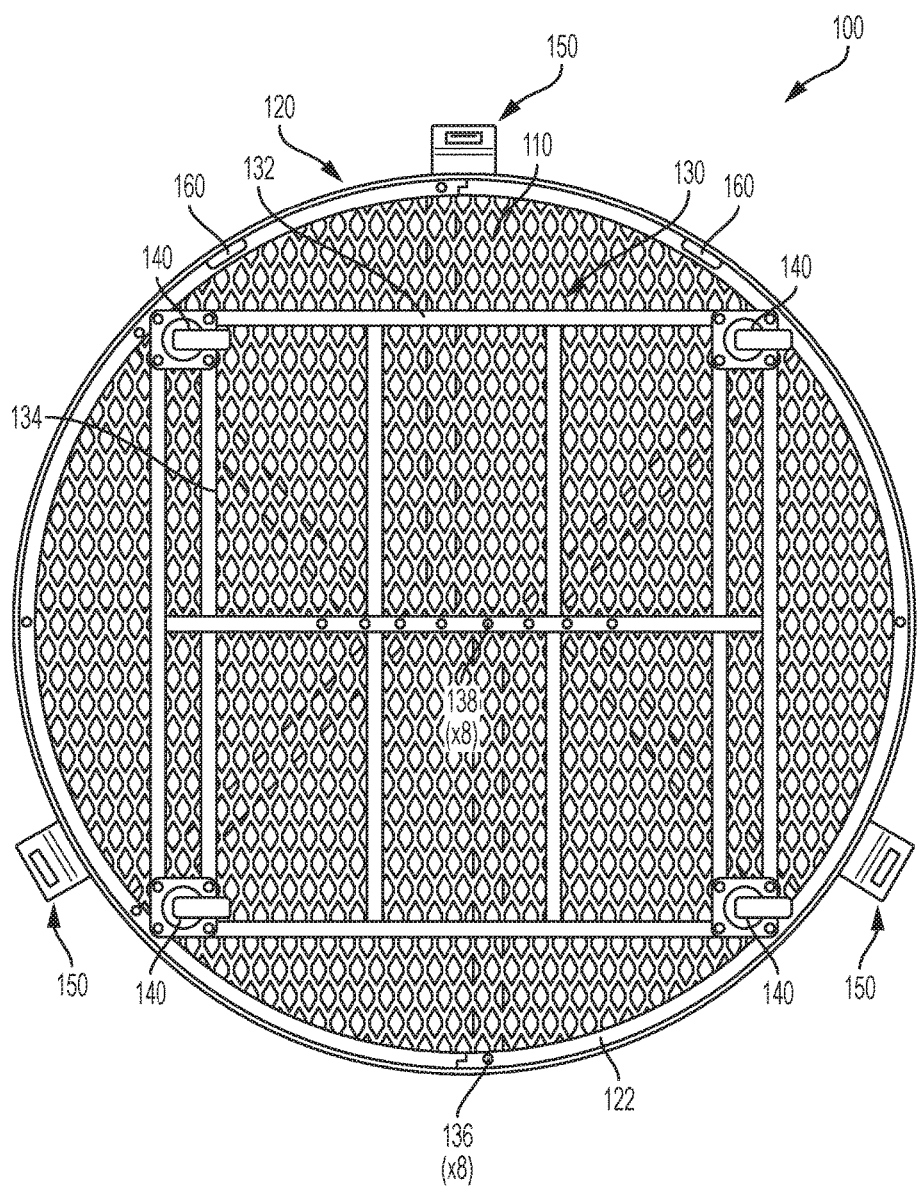
FIG. 12 is a bottom view of the material handling device depicted in FIG. 9.
Figure 13:
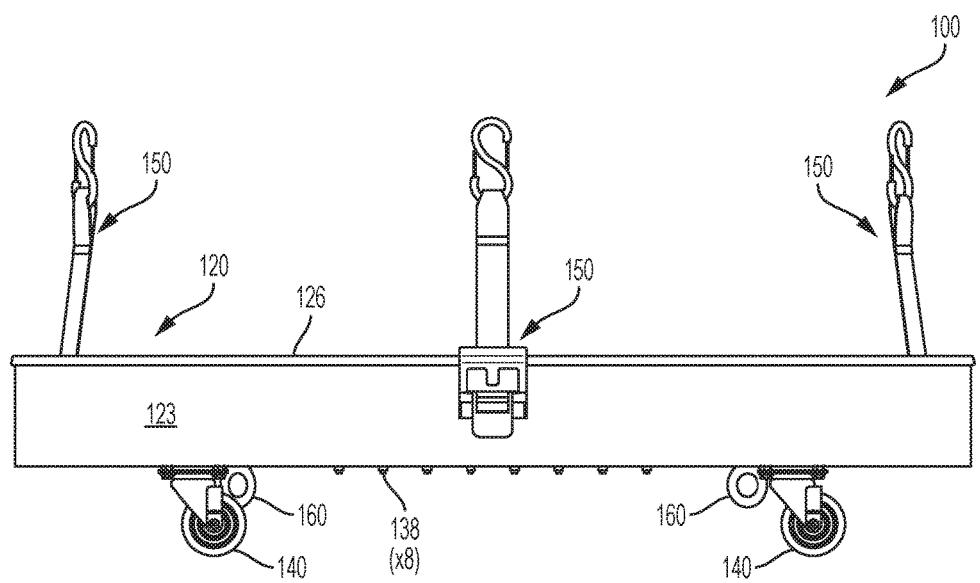
FIG. 13 is a front view of the material handling device depicted in FIG. 9.
Figure 14:
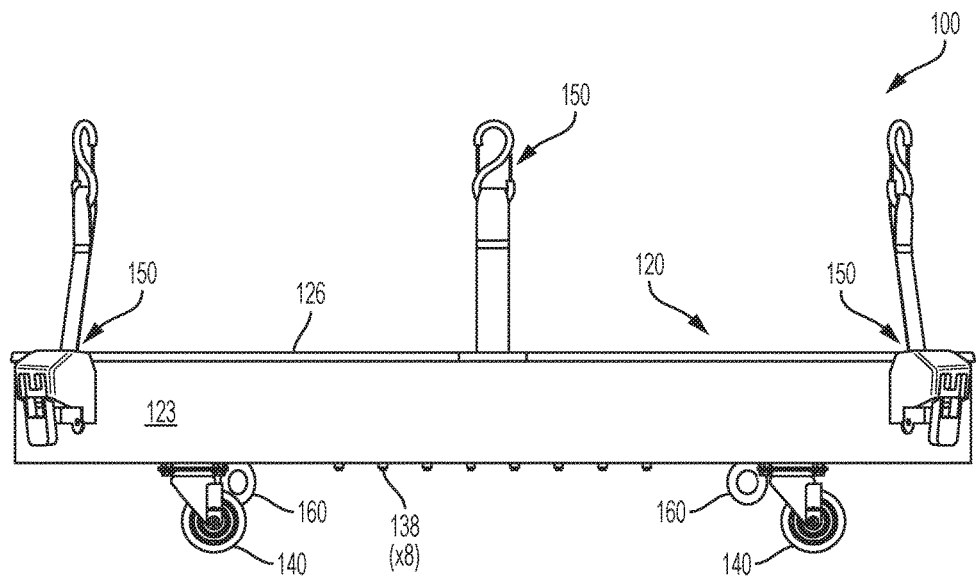
FIG. 14 is a rear view of the material handling device depicted in FIG. 9.
Figure 15:
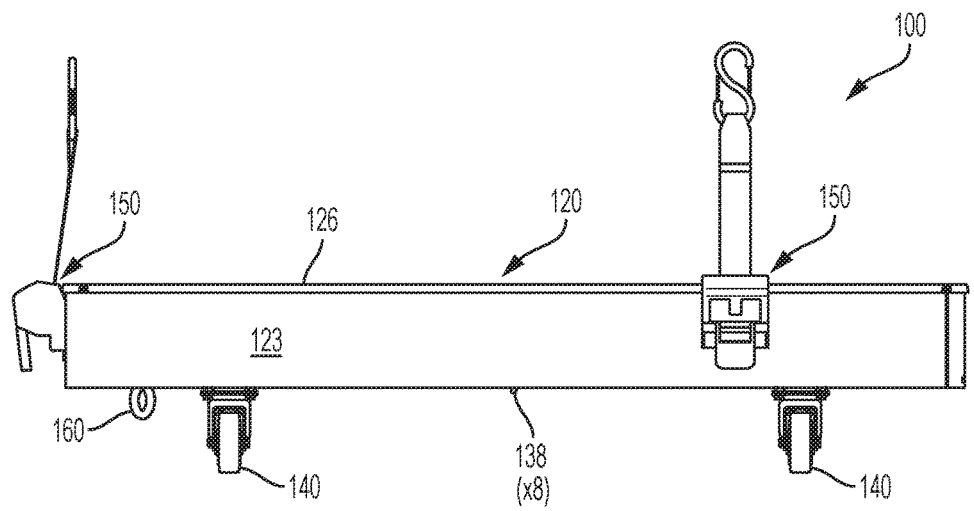
FIG. 15 is a left side view of the material handling device depicted in FIG. 9.
Figure 16:
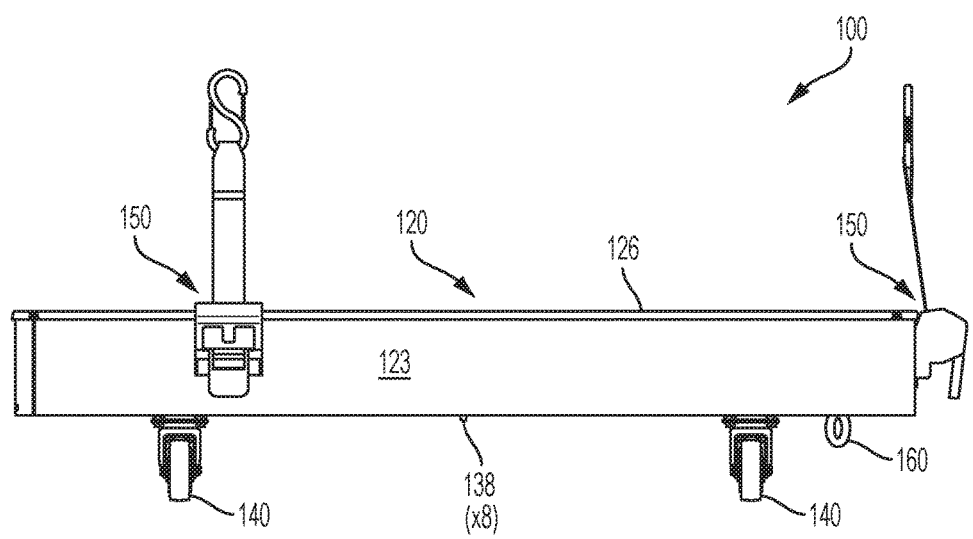
FIG. 16 is a right side view of the material handling device depicted in FIG. 9.

FIGS. 9-16 present various views of material handling device 100, in accordance with an embodiment of the present invention.

In this embodiment, material handling device 100 has a round shape approximately 60 inches in diameter, and includes bottom 110, wall 120, frame 130 and wheels 140. In other embodiments, material handling device 100 may have different dimensions and shapes, such as, for example, a 48 inch diameter, a square shape, a rectangular shape, a triangular shape, etc.

Bottom 110 may be formed from steel mesh, such as, for example, 1½" #9 flattened expanded steel. In other embodiments, bottom 110 may be formed from solid steel sheet, perforated steel sheet, aluminum mesh, aluminum sheet, perforated aluminum sheet, etc. When present, the openings in the material selected for bottom 110 advantageously allow smaller items to fall through while preventing larger items from falling through. The size of the openings determines whether a particular item will fall through bottom 110.

Rubber strips 112 may be attached to the upper surface of bottom 110, which advantageously prevents metal parts loaded into material handling device 100 from touching the metal of bottom 110. In this embodiment, eight rubber strips are arranged on the upper surface of bottom 110; other numbers of rubber strips 112 may also be used. In one embodiment, rubber strips 112 are 0.5 inches thick and have a Shore 70A hardness.

Wall 120 may be formed from steel, such as, for example, 1008 plain steel, 1010 plain steel, etc., having a thickness of approximately 0.1 inches. In other embodiments, wall 120 may have a different thickness, wall 120 may be formed from a different material (such as, for example, aluminum, etc.), etc. In this embodiment, wall 120 surrounds or encloses bottom 110 and frame 130; in other embodiments, wall 120 may surround or enclose either bottom 110 or frame 130, wall 120 may partially surround or enclose bottom 110 or frame 130, wall 120 may partially surround or enclose bottom 110 or frame 130.

Inner shelf 122 is disposed along the lower portion of the inner surface 121 of wall 120. Inner shelf 122 is formed from steel, such as, for example, 1008 plain steel, 1010 plain steel, etc., and has a thickness of approximately 0.25 inches and a depth of approximately 0.5 inches. In other embodiments, inner shelf 122 may have a different thickness or depth, and may be formed from a different material (such as, for example, aluminum, etc.), etc. Inner shelf 122 is attached to inner surface 121 of wall 120 using, for example, a TIG weld, a MIG weld, etc. Similarly, bottom 110 is attached to the upper surface of inner shelf 122 using, for example, a TIG weld, a MIG weld, etc., and frame 130 is attached to the lower surface of inner shelf 122 using, for example, a TIG weld, a MIG weld, etc.; other attachment mechanisms may also be used. In this embodiment, rubber strips 112 are secured to the upper surface of inner shelf 122 using countersunk flat head screws 138; other permanent, semi-permanent or temporary attachment mechanisms may also be used, such as, for example, hex head screws, plastic cable ties, etc.

In certain embodiments, inner surface 121 and upper edge 126 of wall 120 may be coated with a polyurethane-elastomer compound, such as, for example, Rhino Tuffgrip®, which advantageously prevents metal parts loaded into material handling device 100 from touching the metal of wall 120. In another embodiment, a rubber cap (not shown) may be attached to the upper edge 126 of wall 120.

Retractable ratchet straps 150 may be attached to the upper portion of the outer surface 123 of wall 120 to advantageously secure a variety of part sizes to material handling device 100. In this embodiment, three retractable ratchet straps 150 are depicted; other numbers and types of tie down mechanisms may also be used. Each retractable ratchet strap 150 includes a ratchet mechanism 151, a retractable strap 152 and an S biner 153. In one embodiment, retractable ratchet straps 50 are Reese retractable transom tie downs (2"×43").

Eye bolts 160 may be attached to, and depend from, the lower surface of inner shelf 122 to advantageously allow several material handling device 100 to be attached to one another, pulled by a forklift, tug, etc. Eye bolts 160 are formed from steel, such as, for example, 1008 plain steel, 1010 plain steel, etc., and are affixed to the lower surface of inner shelf 122 at the front of material handling device 100 using, for example, a TIG weld, a MIG weld, etc. In this embodiment, two eye bolts are used; other numbers and types of tow points may also be used.

Frame 130 generally provides support for bottom 110 and wall 120. Generally, frame 130 is formed in a grid pattern from tubes made from steel, such as, for example, 1008 plain steel, 1010 plain steel, etc., that are attached together using, for example, TIG welds, MIG welds, etc. The upper surfaces of each tube collectively form the upper surface of frame 130, while the lower surfaces of each tube collectively form the lower surface of frame 130. In this embodiment, frame 130 includes three (3) transverse rectangular tubes 132 and six (6) longitudinal rectangular tubes 34. Other shapes and numbers of transverse rectangular tubes 132 and longitudinal rectangular tubes 134 may also be used.

Rubber strips 112 are secured to the middle transverse rectangular tube 132 of frame 130 using countersunk flat head screws 138; other permanent, semi-permanent or temporary attachment mechanisms may also be used, such as, for example, hex head screws, plastic cable ties, etc. A wheel 140 may be attached to each lower corner of frame 130. The layout of the tubes of frame 130 and the location of wheels 140 advantageously allow the material handling device 100 to be raised by a forklift from any side, to be raised by a pallet jack device from any side, etc. In this embodiment, wheels 140 are swivel caster wheels.

The many features and advantages of the invention are apparent from the detailed specification, and, thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and, accordingly, all suitable modifications and equivalents may be resorted to that fall within the scope of the invention.

What is claimed is:

1. A material handling device, comprising:
   a bottom including an upper surface and a lower surface;
   a frame including an upper surface and a lower surface;
   a wall, surrounding the bottom and the frame, including:
      an inner surface,
      an outer surface, and
      an inner shelf, attached to a lower portion of the inner surface, including:
         an upper surface attached to a portion of the lower surface of the bottom, and
         a lower surface attached to a portion of the upper surface of the frame; and
   a plurality of wheels, each wheel attached to the lower surface of the frame.

2. The material handling device according to claim 1, wherein the bottom is round, the wall is round, and the frame is rectangular.

3. The material handling device according to claim 1, wherein the bottom is flattened expanded steel, and the wall is steel.

4. The material handling device according to claim 3, wherein the frame includes a plurality of steel tubes arranged in a grid pattern.

5. The material handling device according to claim 4, wherein the portion of the lower surface of the bottom is welded to the upper surface of the inner shelf, the portion of the upper surface of the frame is welded to the lower surface of the inner shelf, and the plurality of steel tubes are welded together to form the frame.

6. The material handling device according to claim 1, further comprising a plurality of rubber strips disposed on the upper surface of the bottom.

7. The material handling device according to claim 6, wherein each rubber strip is attached to one of the steel tubes of the frame and to the inner shelf of the wall.

8. The material handling device according to claim 7, wherein each rubber strip is attached using countersunk flat head screws.

9. The material handling device according to claim 7, wherein each rubber strip is attached using plastic cable ties.

10. The material handling device according to claim 1, further comprising an eye bolt attached to, and depending from, the lower surface of the inner shelf.

11. The material handling device according to claim 10, wherein the eye bolt is welded to the lower surface of the inner shelf.

12. The material handling device according to claim 1, further comprising a plurality of retractable ratchet straps attached to the outer surface of the wall.

13. The material handling device according to claim 12, wherein each retractable ratchet strap includes a ratchet mechanism, a retractable strap and an S biner.

14. The material handling device according to claim 1, wherein the wheels are swivel caster wheels.

15. The material handling device according to claim 1, wherein a lower portion of the wall includes a cut out region.

\* \* \* \* \*